United States Patent
Cui et al.

(10) Patent No.: US 11,977,663 B2
(45) Date of Patent: May 7, 2024

(54) PROCESSING UNIT, ELECTRONIC DEVICE, AND SECURITY CONTROL METHOD

(71) Applicant: Alibaba Group Holding Limited, Grand Cayman (KY)

(72) Inventors: Xiaoxia Cui, Hangzhou (CN); Xuanle Ren, Shanghai (CN)

(73) Assignee: Alibaba Group Holding Limited, Grand Cayman (KY)

( * ) Notice: Subject to any disclaimer, the term of this patent is extended or adjusted under 35 U.S.C. 154(b) by 51 days.

(21) Appl. No.: 17/150,478

(22) Filed: Jan. 15, 2021

(65) Prior Publication Data

US 2021/0224426 A1 Jul. 22, 2021

(30) Foreign Application Priority Data

Jan. 19, 2020 (CN) .......................... 202010058578.8

(51) Int. Cl.
*G06F 21/74* (2013.01)
*G06F 1/26* (2006.01)
*G06F 15/78* (2006.01)
*G06F 21/60* (2013.01)
*H04L 9/08* (2006.01)

(52) U.S. Cl.
CPC ................ *G06F 21/74* (2013.01); *G06F 1/26* (2013.01); *G06F 21/602* (2013.01); *H04L 9/08* (2013.01); *G06F 15/7807* (2013.01); *G06F 2221/2149* (2013.01)

(58) Field of Classification Search
CPC .......... G06F 21/74; G06F 1/26; G06F 21/602; G06F 15/7807; G06F 2221/2149; H04L 9/08
See application file for complete search history.

(56) References Cited

U.S. PATENT DOCUMENTS

| | | |
|---|---|---|
| 8,694,795 B1 | 4/2014 | Aissi |
| 8,935,746 B2 | 1/2015 | Vetillard |
| 8,996,864 B2 | 3/2015 | Maigne et al. |
| 9,430,641 B1 | 8/2016 | Marion et al. |
| 9,756,066 B2 | 9/2017 | Gupta et al. |
| 9,767,317 B1 | 9/2017 | Chakrovorthy et al. |

(Continued)

FOREIGN PATENT DOCUMENTS

| | | |
|---|---|---|
| CN | 103514414 | 1/2014 |
| CN | 104881596 | 9/2015 |

(Continued)

*Primary Examiner* — Jung W Kim
*Assistant Examiner* — Alan Lingqian Kong

(57) ABSTRACT

A processing unit comprising: a processor; and a memory, coupled to the processor and adapted to provide a plurality of enclaves isolated from each other, where the plurality of enclaves include a plurality of application enclaves, each of the application enclaves is used for running a respective application program, and the plurality of enclaves further include at least one of the following: a runtime enclave adapted to provide a storage space required for an invokable program; and a crypto enclave adapted to provide a storage space required for a crypto related program, wherein the runtime enclave and the crypto enclave have read/write permission for the plurality of application enclaves, and each of the application enclaves has no read/write permission for the runtime enclave and the crypto enclave.

20 Claims, 8 Drawing Sheets

(56) References Cited

U.S. PATENT DOCUMENTS

| | | | |
|---|---|---|---|
| 9,990,197 B2* | 6/2018 | Leslie-Hurd | G06F 12/0875 |
| 10,169,574 B2* | 1/2019 | Nesher | G06F 21/53 |
| 10,204,229 B2 | 2/2019 | Hoogerbrugge et al. | |
| 10,311,217 B2 | 6/2019 | Miller et al. | |
| 10,354,095 B2* | 7/2019 | Xing | G06F 9/44505 |
| 10,579,806 B1 | 3/2020 | Pyo et al. | |
| 10,592,670 B2 | 3/2020 | Poornachandran et al. | |
| 10,635,605 B2 | 4/2020 | Leitao et al. | |
| 10,671,542 B2* | 6/2020 | Shanbhogue | G06F 3/0673 |
| 10,757,111 B1 | 8/2020 | Marek et al. | |
| 10,868,675 B2 | 12/2020 | Walker et al. | |
| 2009/0293129 A1 | 11/2009 | Henry et al. | |
| 2012/0159184 A1* | 6/2012 | Johnson | G06F 21/645 |
| | | | 713/189 |
| 2013/0152180 A1 | 6/2013 | Nair et al. | |
| 2013/0159726 A1 | 6/2013 | McKeen et al. | |
| 2013/0312117 A1 | 11/2013 | Sapp, II et al. | |
| 2014/0047548 A1 | 2/2014 | Bye et al. | |
| 2014/0229942 A1* | 8/2014 | Wiseman | G06F 21/74 |
| | | | 718/1 |
| 2014/0281560 A1 | 9/2014 | Ignatchenko et al. | |
| 2014/0317686 A1 | 10/2014 | Vetillard | |
| 2015/0186272 A1* | 7/2015 | Goldsmith | G06F 12/084 |
| | | | 711/130 |
| 2015/0186659 A1* | 7/2015 | Leslie-Hurd | G06F 9/3004 |
| | | | 726/1 |
| 2015/0186678 A1* | 7/2015 | Leslie-Hurd | G06F 21/60 |
| | | | 726/26 |
| 2016/0171248 A1 | 6/2016 | Nesher et al. | |
| 2016/0350534 A1 | 12/2016 | Poornachandran et al. | |
| 2017/0024568 A1 | 1/2017 | Pappachan et al. | |
| 2017/0185766 A1* | 6/2017 | Narendra Trivedi | |
| | | | G06F 21/606 |
| 2017/0286668 A1 | 10/2017 | Shanahan | |
| 2018/0081824 A1 | 3/2018 | Bacher et al. | |
| 2018/0157808 A1 | 6/2018 | Jeon et al. | |
| 2018/0212939 A1* | 7/2018 | Costa | G06F 21/6209 |
| 2018/0285560 A1* | 10/2018 | Negi | G06F 21/72 |
| 2018/0330120 A1 | 11/2018 | Ray et al. | |
| 2018/0349101 A1 | 12/2018 | Lyras et al. | |
| 2019/0042759 A1 | 2/2019 | Smith et al. | |
| 2019/0052634 A1 | 2/2019 | Bhatia et al. | |
| 2019/0102567 A1 | 4/2019 | Lemay et al. | |
| 2019/0213319 A1 | 7/2019 | Gerebe et al. | |
| 2019/0227887 A1 | 7/2019 | Hu et al. | |
| 2019/0294800 A1 | 9/2019 | Andrews et al. | |
| 2020/0007332 A1 | 1/2020 | Girkar et al. | |
| 2020/0117774 A1 | 4/2020 | Sasson et al. | |
| 2020/0143042 A1 | 5/2020 | Dhoble et al. | |
| 2020/0193032 A1 | 6/2020 | Dikhit et al. | |
| 2020/0285759 A1 | 9/2020 | Buendgen et al. | |
| 2020/0364711 A1* | 11/2020 | Sarin | G06Q 20/3672 |

FOREIGN PATENT DOCUMENTS

| | | |
|---|---|---|
| CN | 104885057 | 9/2015 |
| CN | 106529349 | 3/2017 |
| CN | 107111715 | 8/2017 |
| CN | 107851163 | 3/2018 |
| CN | 109154972 | 1/2019 |
| CN | 110199286 | 9/2019 |
| CN | 110427274 A | 11/2019 |
| CN | 110659458 | 1/2020 |
| EP | 3175575 A1 | 6/2017 |
| KR | 101687275 B1 | 12/2016 |
| KR | 20170142672 | 12/2017 |
| TW | I546699 A | 5/2016 |
| WO | 2013095437 A1 | 6/2013 |
| WO | 2019212579 | 11/2019 |
| WO | 2019219181 A1 | 11/2019 |

\* cited by examiner

PROCESSING UNIT, ELECTRONIC DEVICE, AND SECURITY CONTROL METHOD

PRIORITY CLAIM

The present application claims priority to China Patent Application No. 202010058578.8 filed Jan. 19, 2020, and titled "PROCESSING UNIT, ELECTRONIC DEVICE, AND SECURITY CONTROL METHOD", incorporated herein by reference in its entirety.

TECHNICAL FIELD

The present invention relates to the field of processor, and more specifically to a processing unit, an electronic device, a computer-readable storage medium and a security control method.

BACKGROUND

With continuous development of smart terminal technologies, various applications (Application, App for short) bring convenience for users, followed by a concern about the security of these application programs by users. Especially in the Internet of Things field, the artificial intelligence field, and some other fields, for application programs involving some sensitive information (for example, information expected not to be acquired by others, such as identity information and property information), users expect that such sensitive information can be effectively protected for security.

Therefore, it is desirable that a trusted execution environment (Trusted Execution Environment, TEE) be established based on a hardware structure such as a processor and a memory, to provide an execution environment with a security protection function for application programs that need to be protected.

In traditional technical solutions, the TEE of a whole electronic device is established mainly based on a complex processor architecture and an independent security chip (discrete from a processor chip). As a result, in a process of transmitting information between the security chip and other hardware structures in the electronic device, good security performance cannot be guaranteed, and transmission efficiency is low.

SUMMARY

In view of this, embodiments of the present invention provide a processing unit, an electronic device, a computer-readable storage medium, and a security control method, to resolve the foregoing problems.

To achieve this objective, according to a first aspect, a processing unit is provided, including: a processor adapted to run a program; and a memory, coupled to the processor and adapted to provide a plurality of enclaves isolated from each other, where the plurality of enclaves include a plurality of application enclaves, each of the application enclaves is used for running a respective application program, and the plurality of enclaves further include at least one of the following: a runtime enclave adapted to provide a storage space required for running an invokable program; and a crypto enclave adapted to provide a storage space required for running a crypto related program, where the runtime enclave and the crypto enclave have at least read/write permission for the plurality of application enclaves, and each of the application enclaves has no read/write permission for the runtime enclave and the crypto enclave.

In some embodiments, the invokable program is a shared program and/or a generic driver oriented to different application programs.

In some embodiments, the processor includes a first processor core adapted to run the crypto related program oriented to a cryptographic service within the crypto enclave.

In some embodiments, the processing unit further includes a key management component adapted to provide the cryptographic service to generate an encryption/decryption result, where the first processor core is coupled to the key management component, and writes the encryption/decryption result into the corresponding application enclave by running the crypto related program within the crypto enclave.

In some embodiments, the processor further includes a second processor core adapted to run corresponding application programs within the plurality of application enclaves.

In some embodiments, the second processor core is implemented based on an RISC-V instruction set architecture.

In some embodiments, the processing unit further includes: a bus structure, coupled to the first processor core, the second processor core, and the memory.

In some embodiments, the processing unit further includes: an address register used for storing address information corresponding to each of the application enclaves; and a permission register used for storing permission information of each of the enclaves, where the processor is adapted to control an access operation of each of the enclaves based on access permission indicated by the permission information, and the access permission includes at least read/write permission and execute permission.

In some embodiments, the permission information of the application enclave is configured with no access permission for the application enclaves other than itself In some embodiments, the permission information of the application enclave is configured with execute permission for the crypto enclave and the runtime enclave, and/or the permission information of the crypto enclave and the runtime enclave is configured with read/write permission and execute permission for the application enclaves.

In some embodiments, the permission information of the runtime enclave is configured with no read/write permission for the crypto enclave, and the permission information of the crypto enclave is configured with no read/write permission for the runtime enclave.

In some embodiments, the permission information of the runtime enclave is configured with no execute permission for the crypto enclave.

In some embodiments, a first application enclave of the plurality of application enclaves shares permission information with a specified second application enclave, such that the second application enclave has temporary access permission for the first application enclave.

In some embodiments, the processing unit is adapted to: run an operating system; run one or more of the application program, the invokable program, and the crypto related program in user mode; and run a secure monitor in machine mode to configure the address register and the permission register, and switch a control right of the processor between different programs within the enclaves.

In some embodiments, the permission information of each of the enclaves is configured with no access permission for the secure monitor, the permission information of the application enclave is configured with no access permission for the operating system, and the permission information of the crypto enclave and the runtime enclave is configured with read/write permission and execute permission for the operating system.

In some embodiments, the processing unit further includes a boot sequence register adapted to store boot sequence information, where based on the boot sequence information, the processor is adapted to first run the secure monitor in a boot process, and then run the crypto related program within the crypto enclave.

In some embodiments, at least one of the enclaves is configured by a corresponding enable tag, where the enable tag indicates that the enclave is in an enabled state, a disabled state, or a partially disabled state.

In some embodiments, the memory includes one or more of a read-only memory module, a dynamic and/or static random access memory module, a nonvolatile random access memory module, and a memory mapped-input/output module.

In some embodiments, the processing unit further includes: a direct storage access controller adapted to access the memory in response to a request of the processor; and/or a power management module adapted to provide a supply voltage required for the processing unit to work.

In some embodiments, the processing unit is integrated into a system on chip.

In some embodiments, the processing unit is a microcontroller.

According to a second aspect, the present invention provides an electronic device, including the processing unit according to any one of the embodiments of the present invention.

According to a third aspect, the present invention provides a security control method, including: configuring a plurality of enclaves isolated from each other in a memory, where the plurality of enclaves includes a plurality of application enclaves, a runtime enclave, and/or a crypto enclave; running a corresponding application program within each of the application enclaves; and running an invokable program within the runtime enclave, and/or running a crypto related program within the crypto enclave, where the runtime enclave and the crypto enclave have at least read/write permission for the plurality of application enclaves, and each of the application enclaves has no read/write permission for the runtime enclave and the crypto enclave.

In some embodiments, the invokable program is a shared program and/or a generic driver oriented to different application programs.

In some embodiments, the security control method further includes: writing an encryption/decryption result into the corresponding application enclave, where the encryption/decryption result is obtained by the crypto related program running within the crypto enclave.

In some embodiments, in user mode, the crypto related program is run by a first processor core, and each of the application programs is run by a second processor core.

In some embodiments, the second processor core is implemented based on an RISC-V instruction set architecture.

In some embodiments, the step of configuring a plurality of enclaves isolated from each other in a memory includes: running a secure monitor in machine mode, where the secure monitor is adapted to configure address information and permission information corresponding to each of the enclaves, so that the security control method controls an access operation of each of the enclaves based on access permission indicated by the permission information in user mode, and the access permission includes at least read/write permission and execute permission.

In some embodiments, the secure monitor is further adapted to: during or after running of a program within one of the plurality of enclaves, switch to another enclave to enable a program within the another enclave to be run by a corresponding processor core.

In some embodiments, permission information of the plurality of enclaves indicates at least one of the following configurations: the application enclave has no access permission for the application enclaves other than itself; the application enclave has execute permission for the crypto enclave and the runtime enclave; the crypto enclave and the runtime enclave have read/write permission and execute permission for the application enclaves; the runtime enclave has no read/write permission for the crypto enclave; the crypto enclave has no read/write permission for the runtime enclave; the runtime enclave has no execute permission for the crypto enclave; and each of the enclaves has no access permission for the secure monitor.

In some embodiments, the security control method further includes: running an operating system, where the permission information of the application enclave is configured with no access permission for the operating system, and the permission information of the crypto enclave and the runtime enclave is configured with read/write permission and execute permission for the operating system.

In some embodiments, the security control method first runs the secure monitor in a boot phase, and then runs the crypto related program within the crypto enclave.

According to a fourth aspect, the present invention further provides a computer-readable storage medium storing instructions thereon, where when the instructions are executed, the steps of the security control method disclosed in the present invention are implemented.

Compared with traditional solutions, the processing unit, the electronic device, and the security control method according to the embodiments of the present invention can establish a TEE within the processing unit based on a plurality of application enclaves, a crypto enclave, and/or a runtime enclave, so as to allocate independent application enclaves for various application programs. In this way, the processing unit can run corresponding application programs independently within the application enclaves, so that it can be ensured that each of the application programs is independently protected for security, enhancing security, and preventing sensitive information involved in the application programs from being stolen.

In some embodiments, a crypto enclave different from the application enclaves is included in the memory, and the processing unit may run a crypto related program within the crypto enclave to further prevent crypto information from being illegally acquired, improving security of the processing unit.

In some embodiments, a runtime enclave different from the application enclaves is included in the memory, and the processor can run shared resources within the runtime enclave, such as a shared program, so that repeated occupation of storage resources can be reduced, saving storage space.

In some optional embodiments, the present invention can set the plurality of enclaves having various categories by only setting two modes (user mode and machine mode), thereby simplifying design, saving costs, and better adapting to a lightweight processing unit and a lightweight electronic device without requiring a complex software and hardware architecture.

In some embodiments, the processing unit of the present invention sets a plurality of enclaves and corresponding processor cores within a system on chip for implementing a trusted execution environment required for a security protection function, so that application programs can communicate with the trusted execution environment within a chip, reducing the design difficulty, complexity, and costs, and improving security.

BRIEF DESCRIPTION OF DRAWINGS

The above and other objectives, features and advantages of the present invention will become more apparent from the description of the embodiments of the present invention with reference to the following accompany drawings. In the drawings.

DESCRIPTION OF EMBODIMENTS

Figure 1:
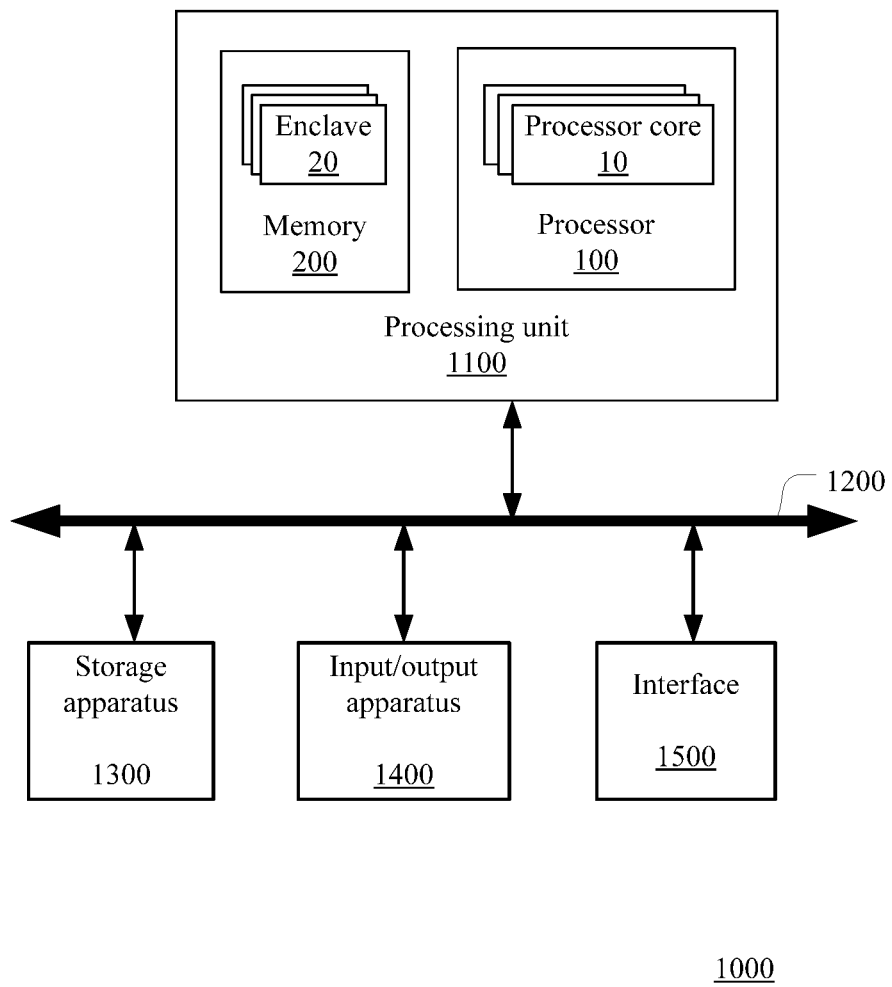
FIG. 1 is a schematic block diagram of an electronic device according to an embodiment of the present invention.

The present invention is described below based on embodiments, but the present invention is not limited to these embodiments. In the following detailed description of the present invention, some specific details are described. Without the description of such details, those skilled in the art can still fully understand the present invention. To avoid confusing the essence of the present invention, well-known methods, processes, and procedures are not described in detail. In addition, the accompany drawings are not necessarily drawn to scale.

The following terms are used in this specification.

Microcontroller: Microcontroller Unit, MCU for short, which generally refers to a system-level chip or a system on chip (System on Chip, SoC for short) implemented based on a processor, a memory, and other hardware modules. A microcontroller can run an operating system (Operating System, OS for short) and application programs. In the Internet of Things field, the artificial intelligence field, and some other fields, microcontrollers are widely applied due to their significant advantages such as high integration and customization.

Memory: a physical structure for storing information, which can be integrated into a processing unit. Information stored in a memory includes instruction information and/or data information represented by data signals. For example, the memory may be used for storing data provided by a processor and code of an application program, and may also be used for implementing information exchange between a processor and a storage apparatus outside the processing unit.

Read/write permission: a collective term for read permission and write permission. If a specified program has read permission for a target storage area, it means that information (code and/or data) in the target storage area can be read, such that information of the target storage area can be loaded to a storage area for running the specified program. If a specified program has write permission for a target storage area, it means that the specified program can modify information in the target storage area.

Execute permission: If a specified program has execute permission for a target storage area, it means that the specified program is allowed to execute or invoke code stored in the target storage area, but the execute permission does not mean that the specified program is allowed to view or read the code stored in the target storage area.

The embodiments of this invention may be applied to the fields of Internet and Internet of Things (Internet of Things, IoT for short), such as a 5G mobile Internet system and a security identification system, and can establish a trusted execution environment for protecting sensitive information within a processing unit. The embodiments of the present invention are described below by taking an application scenario of a smart refrigerator as an example. However, it should be appreciated that of embodiments of the present invention is not limited thereto, and embodiments may also apply to any scenarios in which sensitive information needs to be protected within a processing unit.

System Overview

Figure 2:
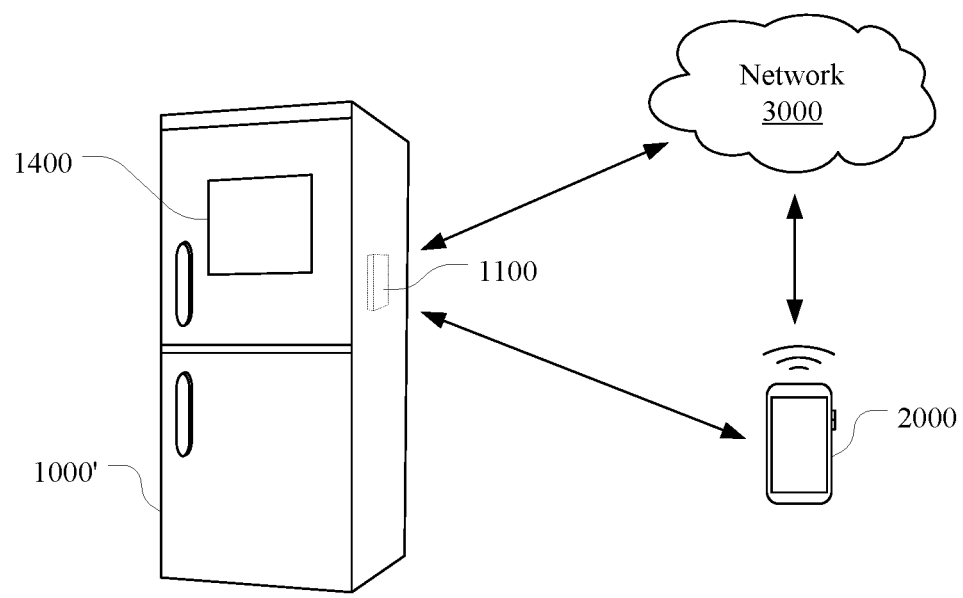
FIG. 2 is a schematic diagram of an example application scenario of an electronic device according to an embodiment of the present invention.

FIG. 1 is a schematic block diagram of an electronic device according to an embodiment of the present invention. FIG. 2 is a schematic diagram of an example application scenario of an electronic device according to an embodiment of the present invention. As described above, the application scenario shown in FIG. 2 is only taken as an illustrative example, but not used to limit practical application scenarios of the electronic device according to the embodiment of the present invention.

The electronic device 1000 shown in FIG. 1 is intended to show at least some components of one or more electronic apparatuses. In other embodiments of the present invention, the components shown in FIG. 1 may be omitted, or connections among the components are implemented with different architectures. Some hardware and/or software modules not shown in FIG. 1 may also be included, and two or more components shown in FIG. 1 may also be combined into one component in a software system and/or hardware system.

In some embodiments, the electronic device 1000 may be a mobile device, a handheld device, or an embedded device, for example, in a smart car, a smart appliance, a biological information recognition system, a bank management system, or a processing platform of Internet of Things devices employing 5G technology. The electronic device 1000 may also be applied to a wearable device (such as a smart watch or smart glasses), or may be a device such as a television set or a set-top-box.

As shown in FIG. 1 and FIG. 2, the electronic device 1000 may include one or more processing units 1100. In some embodiments, the processing unit 1100 in the electronic device 1000 may be flexibly designed in terms of architecture and function. For example, in a scenario that requires low power consumption and a specialized function, the electronic device 1000 according to the embodiments of the present invention may be more simplified and have a lower power consumption than a large computer device such as a personal computer or a server terminal, and therefore is suitable for various Internet of Things devices, embedded devices, smart terminal devices, and the like.

One or more processing units 1100 in the electronic device 1000 may be implemented based on a printed circuit board, or may be a separately packaged chip (for example, a microcontroller), or may be implemented by a hardware structure and/or software integrated in a system on chip.

In some embodiments, the electronic device 1000 may further include one or more co-processors for executing instructions and data not involving sensitive information.

As shown in FIG. 1, the electronic device 1000 further includes a system bus 1200, and the processing unit 1100 may be coupled to one or more system buses 1200. The system bus 1200 may be used to transmit signals between the processing unit 1100 and other components in the electronic device 1000, for example, transmitting addresses, data, or control signals. The system bus 1200 may include but is not limited to: a bus based on peripheral component interconnect (Peripheral Component Interconnect, PCI), a memory bus, or other types of buses.

Generally, as shown in FIG. 1, the electronic device 1000 may further include one or more storage apparatus 1300 communicating with the processing unit 1100 via the system bus 1200. The storage apparatus 1300 is used to provide additional storage space for the electronic device, for example, for storing data and/or instructions other than sensitive information.

The electronic device 1000 may also be coupled to an input/output apparatus 1400 via the system bus 1200. In some embodiments, the input/output apparatus 1400 may provide a user interface in response to a user operation. Information provided or acquired by the input/output apparatus 1400 based on the user operation may be stored in the storage apparatus 1300 and/or the processing unit 1100 under the control of the processing unit 1100. Generally, the sensitive information (such as fingerprint information and property data) provided by the input/output apparatus 1400 may be processed in a TEE established by the processing unit 1100.

The input/output apparatus 1400 may include a display device to display information that the user needs to know. The display device is, for example, a cathode ray tube (Cathode Ray Tube, CRT for short) display, a liquid crystal display (Liquid Crystal Display, LCD for short), or an organic light-emitting diode (Organic Light-Emitting Diode, OLED for short) array display. In some embodiments, the input/output apparatus 1400 may include an input device such as a touch panel, used to transmit information corresponding to the user operation to the processing unit 1100 and/or a corresponding co-processor via the system bus 1200, such that the processing unit 1100 and/or the co-processor can respond to the user operation. In some embodiments, the input/output apparatus 1400 may include an acquisition device. The acquisition device may be coupled to the system bus 1200 to transmit instructions and data related to acquirable information such as images/sound. The acquisition device is, for example, a microphone and/or a device for acquiring images such as a camcorder or a camera.

The electronic device 1000 may include one or more interfaces 1500 integrated into the processing unit 1100 or coupled to the processing unit 1100 via the system bus 1200, such as a network interface. The electronic device 1000 may access a network via the network interface and a corresponding communication module. The network is, for example, a local area network (LAN), a wide area network (WAN), a metropolitan area network (MAN), a personal area network (PAN), Bluetooth, a cloud network, a mobile network (such as a long term evolution (Long Term Evolution, LTE) network, a 3G network, a 4G network, or a 5G network), an Intranet, or the Internet. The network interface may include a wireless network interface having at least one antenna and/or a wired network interface for communication over a network cable. The network cable may be an Ethernet cable, a coaxial cable, an optical fiber cable, a serial cable, or a parallel cable.

The network interface may, for example, provide access to a LAN based on IEEE 802.11b and/or 802.11g standards, or provide access to a personal area network based on Bluetooth standards, or support other wireless network interfaces and/or protocols, including existing communication standards and future communication standards. The network interface may also use time division multiple access (TDMI) protocols, global system for mobile communications (GSM) protocols, code division multiple access (CDMA) protocols, and/or other types of wireless communications protocols.

It should be noted that the above description and FIG. 1 are only used for exemplary description of the electronic device 1000, but not to limit a specific implementation of the electronic device 1000. The electronic device 1000 may also include other components, such as a data processing unit. The components in the electronic device 1000 described above may also be omitted suitably in practical applications.

As an example, the electronic device 1000 shown in FIG. 1 is, for example, the refrigerator 1000' shown in FIG. 2. In the example shown in FIG. 2, the input/output apparatus 1400 includes, for example, a display touch panel, an image acquisition apparatus, and the like. The image acquisition apparatus may obtain a user's facial image. The processing unit 1100 may run a face recognition program based on the image data acquired by the image acquisition apparatus, and run a push program based on a face recognition result to push information (for example, including food items frequently purchased, relevant purchase links, and the like) related to historical records of the current user to a display touchscreen. The user may acquire information provided by a network 3000 by operating the display touchscreen, may directly configure the processing unit 1100 in the refrigerator 1000' by operating a mobile terminal device 2000 (for example, a smartphone), or configure the processing unit 1100 in the refrigerator 1000' over the network 3000, and may also view information returned to the mobile terminal device 2000 by the processing unit 1100.

In the example in FIG. 2, the processing unit 1100 may also run a face-scanning payment program to complete an online payment process based on facial image data provided by the user.

In the example in FIG. 2, in a case in which the processing unit 1100 built in the refrigerator 1000' is controlled through the mobile terminal device 2000, the mobile terminal device 2000 needs to pair with the processing unit 1100 and exchange information. In the pairing process and the information exchange process, the processing unit 1100 may be required to implement information encryption and decryption, and sensitive information such as facial image data, purchase habit data, and property and account data also needs to be protected within the processing unit 1100. The processing unit 1100 according to the embodiments of the present invention may prevent the sensitive information and crypto information from being stolen by an unexpected program by setting various enclaves, thereby improving security of the electronic device 1000.

Processing Unit

The processing unit 1100 according to the embodiment of the present invention is used to establish and control one or more TEEs that can provide a security protection function. For each TEE, an instruction cannot access the TEE without its permission, and a program running within the TEE may be not interfered by a regular operating system and/or other TEEs, so that instructions and/or data running in different TEEs can be protected separately in the respective TEEs for higher security, privacy, and integrity.

Figure 3:
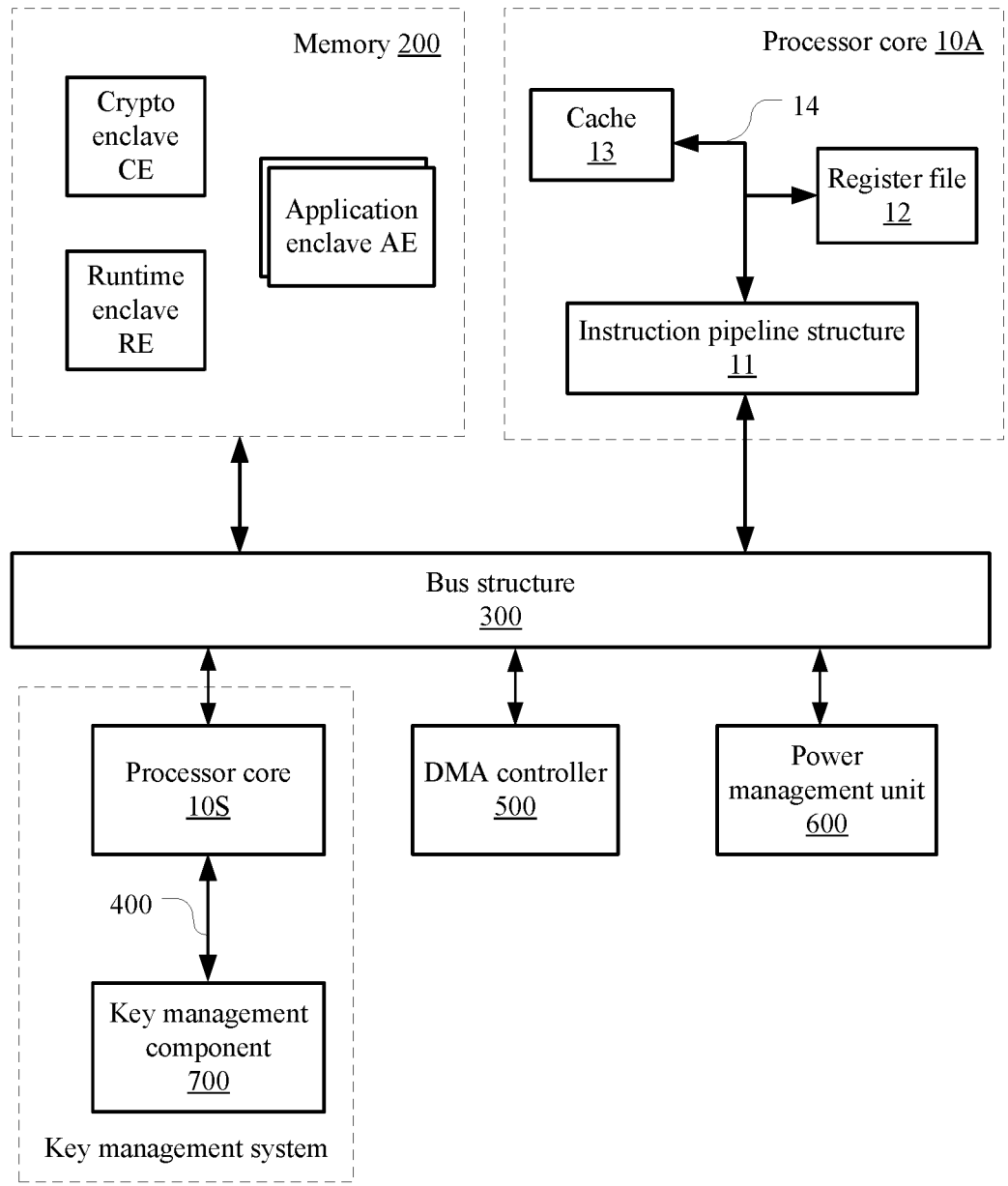
FIG. 3 is a schematic structural diagram of a processing unit according to an embodiment of the present invention.

The processing unit 1100 according to the embodiment of the present invention is, for example, a microcontroller implemented by cooperative work between a hardware architecture and a software architecture integrated in a system on chip or a single chip. FIG. 3 is a schematic block diagram of a processing unit 1100 according to an embodiment of the present invention.

As shown in FIG. 1 and FIG. 3, the processing unit 1100 may include a processor 100 for processing data and instructions, and the processor 100 may include one or more processor cores 10 (FIG. 3 shows a processor core 10A and a processor core 10S for example). There may be a specific instruction set integrated in each processor core 10. In some embodiments, the instruction set may, for example, support complex instruction set computing (Complex Instruction Set Computing, CISC), reduced instruction set computing (Reduced Instruction Set Computing, RISC), or very long instruction word (Very Long Instruction Word, VLIW)-based computing. Different processor cores 10 may each process a different instruction set. In some embodiments, one or more processor cores 10 may also be other processing modules, for example, a digital signal processor (Digital Signal Processor, DSP).

In some embodiments, as shown in FIG. 3, the processor 100 may include one or more caches 13, and depending on different architectures, the cache 13 may include a single or multi-level internal cache located inside and/or outside each processor core 10, or may include a cache shared by components (for example, different processor cores 10) in the processor 100. Furthermore, the cache 13 may include an instruction-oriented instruction cache and a data-oriented data cache.

Each processor core 10 may execute an instruction based on an instruction pipeline. Instruction pipelining is an instruction processing method to increase efficiency by dividing a processing process of an instruction into multi-stage instruction operations such as fetch (Fetch), decode (Decode), execute (Execute), memory access (Memory Access), and retire (Retire), with each stage instruction operation being implemented by a dedicated unit. As shown in FIG. 3, to process an instruction, each processor core 10 may include an instruction pipeline structure 11 implemented by cooperation between software and hardware. The instruction pipeline structure 11 may include: a fetch unit for fetching an instruction, a decode unit for decoding the instruction into an executable format, an execute unit for executing the instruction, a memory access unit for accessing a corresponding storage area based on the instruction (may also be considered as an execute unit), and a retire unit for removing a related scheduling process after the execution of the instruction is complete. In some embodiments, the instruction pipeline structure implements two- or more-stage instruction operations. For example, instruction processing may be implemented only by the fetch unit and the execute unit, or instruction processing may be partly implemented by the fetch unit, the decode unit, and the execute unit.

In some embodiments, each processor core 10 may further include a register file 12 and an intra-core interconnect structure 14. The register file 12 may include one or more physical registers. Information stored in each physical register may indicate: one or more data types (such as scalar integer, scalar floating point, packed integer, packed floating point, vector integer, and vector floating point), status (such as access permission information), address (such as a pointer or an address for fetching an instruction), and other information. Inside each processor core 10, the intra-core interconnect structure 14 may implement interconnection among components of the processing core 10 (for example, the register file 12 may provide a pointer for fetching an instruction to the fetch unit through the intra-core interconnect structure 14), and may also couple the components inside the processor core 10 to a bus structure 300 outside the processor core 10.

It should be noted that this disclosure is only used for example description of one of the processors 100, but not to limit a specific implementation of the processor 100. The processor 100 may also include other components, such as a data processor (Digital Signal Processor, DSP). The components in the processor 100 described above may also be omitted suitably in practical applications. In some embodiments, other processors not shown may also be integrated in the processing unit 1100.

Further, as shown in FIG. 3, the processing unit 1100 further includes a memory 200 for storing data information and code information. The memory 200 may include storage structures such as a random access memory and a read only memory (Read Only Memory, ROM for short). The random access memory in the memory 200 may be used for running a program, and may, for example, include a non-volatile random access memory (Non-Volatile Random Access Memory, NVRAM for short), or may include storage structures such as a volatile dynamic random access memory (Dynamic Random Access Memory, DRAM for short) and/or a static random access memory (Static Random Access Memory, SRAM). The ROM in the memory is, for example, implemented by a structure such as a flash memory (FLASH Memory), mainly for storing code information and instruction information. As an example, the processor 100 may access the ROM to acquire code information and instruction information, and implement data storage and/or read/write by accessing the random access memory, so that the processor 100 can implement program running based on a storage space provided by the memory 200.

In some optional embodiments, the memory 200 may further include an MMIO (Memory-mapped I/O, memory-mapped input/output interface) for coupling to a storage apparatus outside the processing unit 1100, so that the storage apparatus and the memory 200 can jointly provide a storage space accessible to the processor 100.

For ease of description, a storage space accessible to the processor 100 is collectively called as a storage unit of the processing unit 1100 in this disclosure. Just as described above, the storage unit of the processing unit 1100 in a physical structure may be implemented by the memory 200 integrated in the processing unit and/or a storage apparatus coupled to the processing unit 1100 via the MMIO. In some embodiments, storage addresses corresponding to the storage unit of the processing unit 1100 may belong to a same addressing space for access by the processor 100.

In an embodiment of the present invention, the storage unit may include a plurality of enclave 20 (also known as Enclave, Secure Enclave, partition, trusted zone, enclave, enclosure, or secure environment), and each enclave is equivalent to an independent trusted execution environment TEE. It should be noted that, although the enclaves shown in FIG. 1 and FIG. 3 are drawn inside the memory 200, just as described above, in some optional embodiments, at least a part of a particular enclave 20 or some enclaves 20 are implemented by the storage apparatus 1300 coupled to the MMIO.

A physical structure that each enclave 20 is based on may be implemented by any one or more storage structures in the storage unit. For example, an enclave 20 for running a program may include: a first storage area provided by an ROM and used for storing code of the program in the storage unit, a second storage area provided by an NVRAM and used for storing required data of the program in the storage unit, and/or a third storage area mapped by the MMIO.

As shown in FIG. 3, the processing unit 1100 further includes a bus structure 300 so that the memory 200 communicates with the processor 100 via the bus structure 300. The bus structure 300 is, for example, an SoC bus, and may be implemented based on a bus protocol such as AXI (Advanced eXtensible Interface).

As an example of the processing unit 1100, the processor core 10A shown in FIG. 3 may be implemented based on an RISC-V instruction set architecture, mainly for executing code of an application program; and the processor core 10S shown in FIG. 3 may be implemented based on various instruction sets, but not limited to the RISC-V instruction set, mainly for managing security information, for example, executing code related to a cryptographic service. However, embodiments of the present invention are not limited thereto. Each processor core 10A integrated in the processing unit 1100 for executing an application program may be implemented based on other instruction set architectures that can be established through a storage protection mechanism and control a plurality of TEEs. The processing unit 1100 may include one or more processor cores 10A, or may include one or more processor cores 10S. The processor core 10A and the processor core 10S may be implemented within a same processor core.

For ease of description and differentiation, in the following description, the processor core 10A is called an application processor core 10A, and the processor core 10S is called a security processor core 10S. The application processor core 10A and the security processor core 10S may support a same instruction set (such as an RISC-V instruction set), or may support different instruction sets (for example, the application processor core 10A supports an RISC-V instruction set, and the security processor core 10S supports other instruction sets).

The application processor core 10A and the security processor core 10S may be coupled to the bus structure 300, but the application processor core 10A may not be allowed to acquire information provided by the security processor core 10S via the bus structure 300. To implement bi-directional communication between the application processor core 10A and the security processor core 10S, the application processor core 10A may communicate with the security processor core 10S via a "mailbox (mailbox)" mechanism, where the "mailbox" mechanism may use the storage unit in the processing unit 1100 to set a shared area (for example, including an inbox for receiving information and an outbox for sending information). The shared area may be accessed by the application processor core 10A and the security processor core 10S, thereby implementing a message request and a response process between the application processor core 10A and the security processor core 10S.

For example, the storage unit in the processing unit 1100 may include a first shared area mem1 and a second shared area mem2, where data can be written into the first shared area mem1 by the application processor core 10A, and can be read by the security processor core 10S; and data can be written into the second shared area mem2 by the security processor core 10S, and can be read by the application processor core 10A. For the application processor core 10A, the first shared area mem1 is equivalent to an outbox, and the second shared area mem2 is equivalent to an inbox. The application processor core 10A can write information required to be transmitted to the security processor core 10S into the first shared area mem1, and can read information from the second shared area mem2. For the security processor core 10S, the second shared area mem2 is equivalent to an outbox, and the first shared area mem1 is equivalent to an inbox. The security processor core 10S can write information required to be transmitted to the application processor core 10A into the second shared area mem2, and can read information from the first shared area mem1. Therefore, based on the first shared area mem1 and the second shared area mem2, the application processor core 10A and the security processor core 10S can implement bi-directional communication.

Within the processing unit 1100, a key management system (Key Management System, KMS for short) may be established based on the security processor core 10S. The key management system is an integrated system for generating, distributing, and managing crypto information of various devices and application programs in the electronic device, as well as a dedicated environment for implementing cryptographic services, and can ensure stable and secure running of the cryptographic services at a hardware level. Functions of the key management system include, for example, encrypting sensitive information by using a key, a certificate, a configuration file, or the like, to protect the security of the sensitive information.

Figure 4:
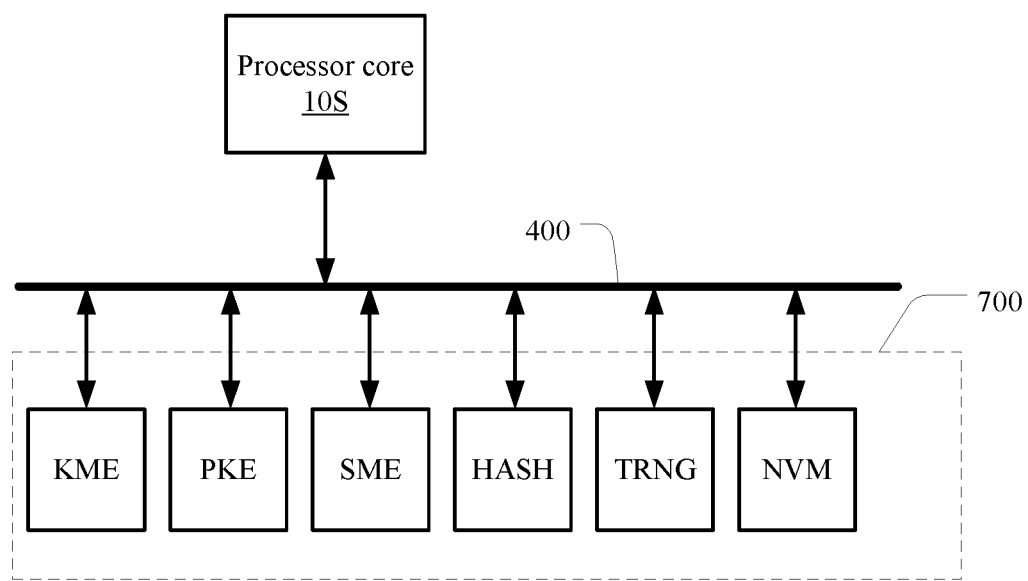
FIG. 4 is a schematic block diagram of a key management system according to an embodiment of the present invention.

FIG. 4 is a schematic block diagram of a key management system according to an embodiment of the present invention.

In addition to the security processor core 10S, as shown in FIG. 3 and FIG. 4, the key management system may also include several key management components 700 integrated in the processing unit 1100 for providing or processing crypto information. The key management components include but are not limited to one or more of the following: a KME (Key Management Engine, key management engine) unit, a PKE (Public Key Encryption, public key encryption) unit, an SME (Symmetric Encryption, symmetric encryption) unit, a HASH (hashing function) algorithm unit, a TRNG (True Random Number Generator, true random number generator) unit, and a non-volatile memory NVM unit. The non-volatile memory NVM in the key management system may be implemented by an eFuse (a one-time programmable memory) and its controller, or may be implemented by a storage structure such as a one time programmable read-only memory (One Time Programmable Read-Only Memory, OTP ROM for short) or a non-volatile random access memory.

To ensure the security of the key management system, the key management components 700 within the key management system cannot be accessed by the application processor core 10A, but can be accessed only by the security processor core 10S. The security processor core 10S may, for example, control the TRNG to generate a true random number, and generate/store various crypto information (a private key, a public key, a certificate, a signature file, and the like) according to the true random number and various crypto algorithms, and may also provide various cryptographic services such as encryption and decryption operations to generate an encryption/decryption result.

In some embodiments, as shown in FIG. 4, to enhance the security of the key management system, a KMS bus 400 isolated from the bus structure 300 may be provided within a security management system, to implement transmission of key related information within the key management system, such as certificate information, authentication information, signature information, and random number information. The key management components 700 may be coupled to the KMS bus 400 to communicate with the security processor core 10S.

With reference to the embodiment shown in FIG. 3, the processing unit 1100 further includes a direct access memory (Direct Access Memory, DMA for short) controller 500 for directly accessing a storage unit to obtain information stored therein (data and/or code), and managing data transmission inside the electronic device. The processor 100 may initialize the DMA controller 500 so that the DMA controller 500 can obtain a control right of the bus structure 300 in response to a DMA transmission request. Then the DMA controller 500 may establish an information transmission path required for the DMA transmission request by issuing a read/write command or the like, so that information transmission can be implemented among components within the processing unit 1100 such as the processor cores 10 and the storage unit when permission allows; and return the control right of the bus structure to the processor 100 after completion of the information transmission, and wait for a next initialization.

The processing unit 1100 may further include: a bridge for bridging the bus structure 300 and a system bus 1200 of the electronic device, a power management unit (Power Management Unit, PMU for short) 600, and an interface module for connecting to peripheral devices such as a disk and a sensor, and may also include various analog components (such as an analog-digital converter, a digital control amplifier, a phase-locked loop, a transmitting/receiving module, and a radio frequency module), various digital components (such as an image processor, an audio processor, and an accelerator), and other hardware components described or not described above.

Figure 5:
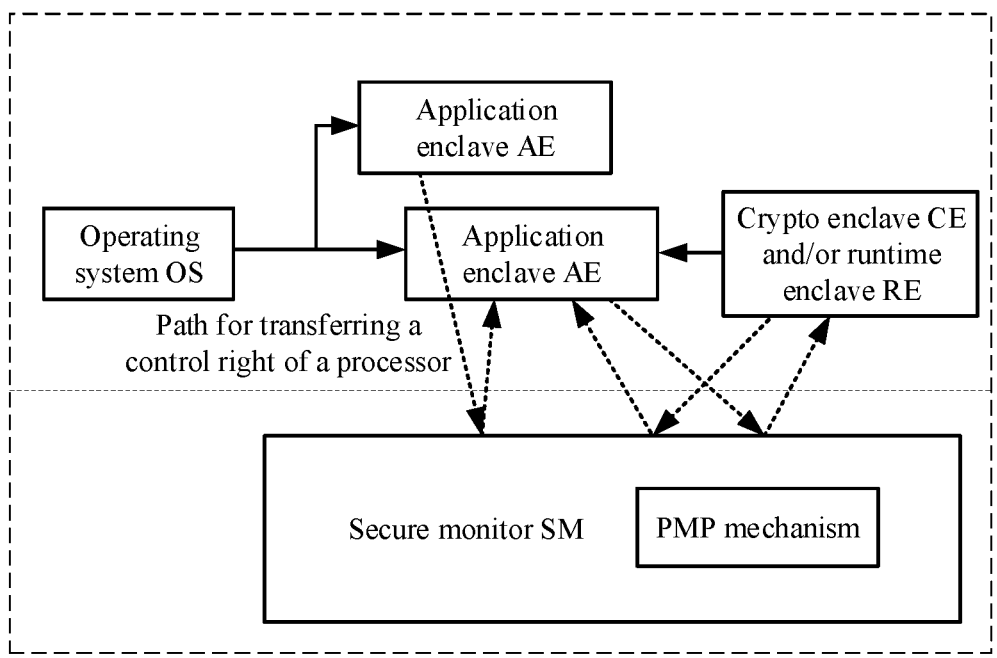
FIG. 5 is a schematic diagram of a path for transferring a control right of a processor within a processing unit according to an embodiment of the present invention.

FIG. 5 is a schematic structural diagram of a software architecture of a processing unit according to an embodiment of the present invention.

Based on the foregoing hardware architecture, an operating system may be run on the processing unit 1100 according to the embodiments of the present invention. The operating system may be used to: control, manage, and schedule access to hardware resources (including the memory, the processor, the storage apparatus, and/or other external devices) in the electronic device; and provide corresponding interfaces (such as a system call interface, System Call Interface) for various application programs. A user and/or an application program can initiate access to the operating system via the corresponding interface to request the operating system to provide corresponding service support (for example, controlling a hardware architecture), such that the processing unit 1100 can perform different tasks based on various application programs.

An application program is mainly used for performing a set task based on user operations, and may be understood as software composed of one or more computer programs. In other words, an application program may include a series of instructions (corresponding to code of the application program) that can be executed by the processing unit 1100, and a set of related data. Application programs may include, for example, a payment application program for implementing property transaction, a service application program for providing a corresponding service based on user's personal information, a game application program, a media application program, and a bottom-layer driver for driving hardware resources. Data and code included in the application programs involving user privacy information such as the payment application and the service application need to be protected, to prevent malicious software from using user privacy information/sensitive information without authorization.

Some application programs may include a host application program (Host Application) and a supplementary application program (also called an Applet). The executable code and related data of the host application program are, for example, stored within the processing unit 1100, and/or within a storage space that can be read by the processing unit 1100. The supplementary application program is, for example, an add-on program or an accessory software for expanding and/or supplementing functions and/or information of the host application program. A code module provided by the supplementary application program (such as a module implemented by source code, target code, and the like) is required to be executed jointly with the host application program. In the description of this disclosure, the host application program and the supplementary application program are uniformly expressed as an application. However, it should be understood that the host application program and the supplemental application program may be specified to run in storage areas isolated from each other in a storage unit of the processing unit 1100, or may be specified to run in a same storage area or two storage areas not isolated from each other in the storage unit of the processing unit 1100.

As described above, since the process of processing instructions and information is implemented by the processor 100, the user can control the operating system by using an application program, such that the processor 100 can acquire corresponding instructions and information from the storage unit under the control of the operating system, and complete the processing of the instructions and information. A processing result can be stored into the storage unit.

In the embodiments of the present invention, the instruction set (such as an RISC-V instruction set) architecture that the processor 100 is based on may define a plurality of right modes (also known as privileged modes, Privileged Mode), including at least user mode (User Mode, U-mode for short) and machine mode (Machine Mode, M-mode for short, or kernel mode).

In some optional embodiments, the processing unit 1100 may also include supervisor mode (Supervisor Mode, S-mode for short), hypervisor mode (Hypervisor Mode, H-mode for short), and other modes, to implement different functions based on different scenarios.

In some embodiments, the processing unit 1100 includes, for example, a mode state register (for example, located in a register file 12, or implemented by another register located within the processing unit) for providing operation codes corresponding to different right modes. The processing unit 1100 may determine whether a current instruction can be executed in the current right mode by viewing the operation codes, thereby implementing functions in different right modes, such as task processing, task protection, hardware abstraction, and visualization.

To prevent an untrusted application program from obtaining sensitive information, various application programs can only be run in protected user mode so that they do not affect running of the operating system or have permission that affects various configurations of machine mode. The operating system can manage and control application programs, and software and hardware resources within other electronic devices. The operating system runs at least in application mode, and in some optional embodiments, the operating system may also run in machine mode.

Machine mode may be understood as a trusted mode. In machine mode, the processing unit 1100 may run a trusted secure monitor (Secure Monitor, SM for short) in a specified storage area (different from the storage area of the operating system) of the storage unit. Code of the secure monitor is generally considered as trusted code by default (which may be stored in a read only memory within the memory). The secure monitor can access components within the electronic device such as the operating system in a trusted way, and therefore can control the storage unit, an input/output interface, and some bottom-layer functions necessary for the boot and configuration processes of the electronic device. Because an application program generally includes untrusted code, the application program is unable to run in machine mode, and both the operating system and the application program have no right to access the secure monitor.

In the embodiments of the present invention, the secure monitor can implement a physical memory protection (Physical Memory Protection, PMP for short) mechanism that is used to specify in machine mode a storage address space that can be accessed in user mode, and grant or deny read permission, write permission, and execute permission, and other permission.

Based on the PMP mechanism, in machine mode, the secure monitor may configure corresponding storage address spaces for a plurality of enclaves 20 isolated from each other (as shown in FIG. 1 and FIG. 3). All or part of the application programs may be loaded into a corresponding enclave 20 to isolate from other application programs and/or information. When the processor 100 needs to run an application program, it may obtain code and/or data stored within the corresponding enclave 20 in one or more authorization modes (such as authentication and signature), and return generated information to the enclave 20, implementing independent running of the application program.

In some embodiments, the secure monitor is also used to switch a process between programs running within the enclaves 20, and may also be used to switch a process between a program running within the enclaves 20 and other programs (such as the operating system). As shown in FIG. 5, under the control of the secure monitor, a control right of a processor may be transferred between different enclaves. A dotted line in FIG. 5 shows a path for transferring the control right of the processor. For example, after code within an enclave is run by an application processor core, the enclave may transfer a control right to the secure monitor, and the secure monitor then transfers the control right to code run within another enclave to start running another application program.

It can be learned that in user mode, even if credibility of an application program is uncontrollable, the processing unit 1100 according to the embodiments of the present invention can implement independent running of various application programs by setting enclaves, so that each application program is limited to access only a storage space specified in the storage unit, and sensitive information provided by the application program limited to be within the specified storage space can also be protected. Therefore, the processing unit 1100 according to the embodiments of the present invention supports isolation of different storage areas in the storage unit at software and hardware levels, such that the plurality of application programs can be executed concurrently in storage areas independent of each other, and the application programs are protected independently without interfering with each other, improving security in user mode.

Enclaves

Figure 6:
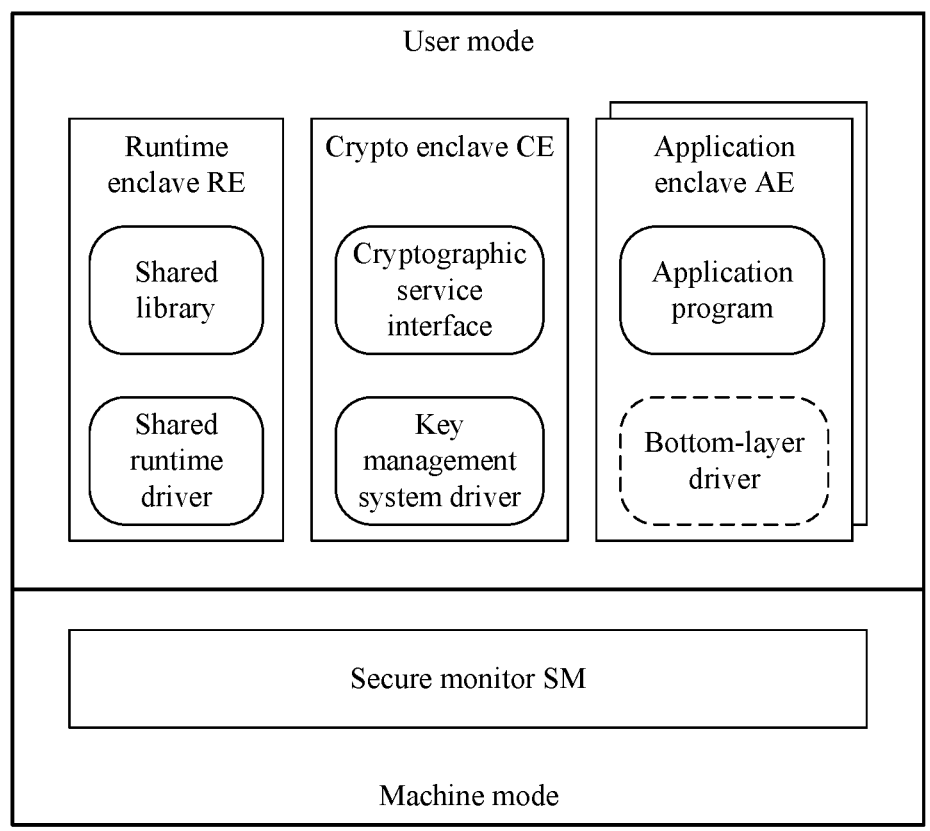
FIG. 6 is a schematic diagram of a software architecture of a processing unit according to an embodiment of the present invention.

FIG. 6 is a schematic diagram of a part of a software architecture of a processing unit according to an embodiment of the present invention.

As shown in FIG. 3, FIG. 5, and FIG. 6, storage area spaces of the storage unit are divided into enclaves 20 with different functions by the secure monitor according to the embodiments of the present invention, including but not limited to: a plurality of application enclaves (App Enclave, AE) oriented to application programs, and non-application enclaves oriented to security information. Based on different content of stored security information, a non-application enclave may further include a crypto enclave (Crypto Enclave, CE) (which may be translated as encryption enclave or given another name) CE and/or a runtime enclave (Runtime Enclave, RE) that are independent of each other. It should be noted that, the embodiments of the present invention do not limit names of the enclaves, that is, the application enclave, crypto enclave, and runtime enclave may be denoted as other names.

In some embodiments, the application processor core 10A can access application enclaves AE to securely run respective application programs within the application enclaves AE; and the security processor core 10S can access a non-application enclave to run a specified program related to security (such as a cryptographic service) within the non-application enclave.

As an example, in description of this embodiment, the plurality of enclaves divided by the secure monitor include a plurality of application enclaves AE, a crypto enclave CE, and a runtime enclave RE. However, it should be noted that the embodiments of the present invention are not limited thereto. In some embodiments of the present invention, the storage unit may include one or more crypto enclaves CE; in some embodiments, the storage unit may include one or more runtime enclaves RE; in some embodiments, the storage unit may only include one or more crypto enclaves CE, but not include a runtime enclave RE, or may only include one or more runtime enclaves RE, but not include a crypto enclave CE; and in some embodiments, each non-application enclave may not be divided into crypto enclaves and/or runtime enclaves, but is used to uniformly store various types of security information.

Different enclaves defined in the embodiments of the present invention are described below.

Application enclave AE: is used to package a corresponding application program (generally specified as an application program involving sensitive information and/or a non-trusted application program), thereby isolating the application program from other application programs/information in user mode. The application enclave AE stores, for example, executable code of the application program and data that can be obtained or generated by the application program. Different application enclaves AE isolated from each other may be divided by the secure monitor for different application programs (which may be the host application program and/or all or a part of the supplementary application programs).

Crypto enclave CE: may be used to implement interaction with the key management system KMS, and is responsible for feeding information to the key management system and/or collecting crypto information (such as a private key for reading a certificate) from the key management system, thereby protecting the crypto information.

In some embodiments, the specified program stored within the crypto enclave CE may be a crypto related program oriented to a cryptographic service, such as code of a cryptographic service interface (Cryptographic Service Interface, CSI for short) application and/or code of a key management system driver (KMS driver) for driving the key management system. When an application App1 stored in an application enclave AE needs to invoke a function in the KMS (such as a symmetric key encryption algorithm provided by an SME unit), the secure monitor SM transfers a control right of the processor 100 from the application processor core 10A to the security processor core 10S, such that the security processor core 10S accesses the crypto enclave CE in the storage area to execute the required function. In this case, the security processor core 10S can access the application enclave AE used for running the application program App1 to obtain necessary information, and perform an algorithm such as encryption and decryption on such information. After the algorithm completes, the security processor core 10S stores a processing result into the application enclave AE corresponding to the application program App1. Later, the secure monitor SM switches the control right of the processor 100 back to the application processor core 10A, such that the application processor core 10A can continue to run the application program App1 in the application enclave AE based on the processing result. Thus, the operating system can drive and/or invoke the key management system by invoking the program stored in the crypto enclave CE, to obtain crypto information provided by the key management system.

Runtime enclave RE: may be used to store shared information (such as a shared program and/or a generic driver) that can be invoked by different application programs to save storage space. As shown in FIG. 6, the shared information includes, for example, a shared library (shared library) and/or an invokable program such as a shared driver. In some embodiments, the shared library includes, for example, a public runtime library (Runtime Library) for supporting development and running of an operating system (for example, providing various application programs with invokable library functions, initialization code, error handling code, and/or exit code), so that the operating system can run different application programs by invoking the shared library stored within the runtime enclave RE, without having to store the same information repeatedly in the storage unit, thereby saving storage space. In some embodiments, the shared driver includes, for example, a runtime driver (Common Runtime Driver). The runtime driver may be invoked by the operating system to drive and configure initialization, error handling, and exit procedures of different application programs.

In some optional embodiments, each processor core 10 in the processor 100 may support an extended instruction set oriented to each enclave. The extended instruction set includes, for example, instructions for performing creation, configuration, and other processes of each enclave, such as operation instructions oriented to each enclave and/or process switching instructions oriented to each enclave.

To ensure security performance of the processing unit 1100, the secure monitor may set (grant/deny) corresponding permission for different enclaves. For example, in some embodiments, an application program stored in the application enclave AE may request to invoke information in the crypto enclave CE and the runtime enclave RE, but is unable to initiate a read/write request to the crypto enclave CE and the runtime enclave RE, thereby ensuring that the information stored within non-application enclaves can be kept confidential and integral.

Figure 7:
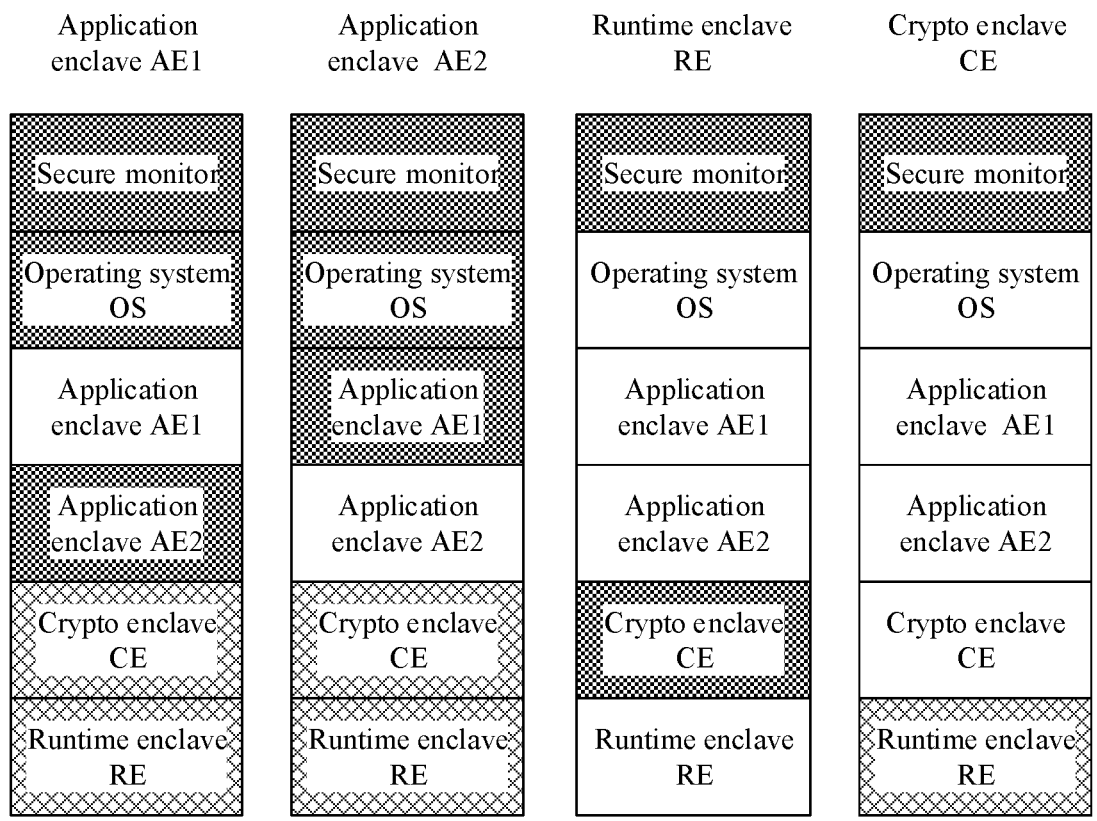
FIG. 7 is a schematic diagram of permission information of various enclaves according to an embodiment of the present invention.

FIG. 7 is a schematic diagram of permission settings of components in a processing unit according to an embodiment of the present invention.

A solution of enclave permission settings of the secure monitor is exemplarily described based on FIG. 7 below. However, the embodiments of the present invention are not limited thereto. The secure monitor may also employ other solutions to isolate different enclaves from each other, and ensure that information stored in the enclaves is protected.

As an example, permission information that can be configured by the secure monitor may indicate access permission (at least including read/write permission and execute permission). Permission information of the enclaves may be stored in corresponding permission registers (for example, implemented by the register file 12 of the processor core 10, or may be implemented by other registers located within the processing unit), or a specified area in the storage unit.

Permission information of an application enclave AE is configured with no access permission for the application enclaves AE other than itself. To be specific, an operating system cannot perform a read operation (reading information), a write operation (writing/modifying information), and an execute operation (executing/invoking executable code) on other application enclaves AE based on an application program stored within any one of the application enclaves AE, so that different application enclaves AE can be isolated from each other without interference. As an example, an application program stored within an application enclave AE1 shown in FIG. 7 has no access permission for an application enclave AE2, and an application program stored within the application enclave AE2 has no access permission for the application enclave AE1.

In some embodiments, permission information of an application enclave AE may be configured with execute permission for a non-application enclave (which may be a crypto enclave CE, or a runtime enclave RE), but no read/write permission for the non-application enclave, thereby ensuring confidentiality and integrity of information stored within the non-application enclave.

In some embodiments, permission information of a non-application enclave (which may be a crypto enclave CE, or a runtime enclave RE) is configured with read/write permission and execute permission for an application enclave AE.

For example, when an application program running within an application enclave AE needs an encryption/decryption service, it cannot directly perform a read operation or a write operation on information within a non-application enclave, but transfers a control right to a security processor core through a trusted secure monitor. In this manner, the security processor core can execute an encryption/decryption service program within a corresponding non-application enclave (such as the foregoing crypto enclave CE) based on a request from the application program, and the encryption/decryption service program can access the application enclave AE to read required data and/or execute required code. After an encryption/decryption result is stored within the application enclave AE, the secure monitor can return the control right to the application processor core, so that in the application enclave AE, the application program can continue to run based on the encryption/decryption result.

In some embodiments, permission information of a non-application enclave may be configured with execute permission for non-application enclaves other than itself, but no read/write permission for non-application enclaves other than itself. For example, running executable code (for example, a corresponding KMS driver) stored within a crypto enclave CE can invoke and execute executable code (for example, a function in a corresponding shared library) stored within a runtime enclave RE, but cannot perform read and write operations, thereby ensuring confidentiality and integrity of information stored within the runtime enclave RE.

In some other embodiments with higher security, a crypto enclave CE for providing crypto related services cannot be accessed (read/write, execute, and invoke) by any other enclaves (such as the above-mentioned runtime enclave), thereby ensuring security of crypto related information. In these embodiments with higher security, the runtime enclave RE cannot execute a program provided within the crypto enclave CE.

In some embodiments, permission information of an application enclave AE may be configured with no access permission for an operating system. To be specific, information stored in a storage area corresponding to the operating system cannot be read, written, modified, or executed by the application program stored within the application enclave AE, so that an untrusted application program is prevented from acquiring sensitive information by controlling/modifying the operating system, which is equivalent to implement one-way isolation of the application enclave AE from the operating system.

In some embodiments, permission information of a non-application enclave (which may be a crypto enclave CE, or a runtime enclave RE) is configured with read/write permission and execute permission for an operating system. Since content stored within the non-application enclave cannot be overwritten by an application program, the content stored within the non-application enclave have a relatively high level of confidence, and information in the operating system generally can be read, written, modified, and executed by executable code stored within the non-application enclave under safe conditions.

In some embodiments, permission information of each enclave may be configured with no access permission for the secure monitor, thereby ensuring a high level of confidence and security of the secure monitor.

Benefiting from the above PMP mechanism, in an optional embodiment, a storage address range of each enclave may be stored as an item list in a set area of the storage unit and/or a specified register (for example, implemented by a register file of the processor core 10, or implemented by other registers located within the processing unit). The item list can only be accessed by the secure monitor. The secure monitor implements address allocation of an enclave by configuring each entry (entry) in the item list.

Each entry may have a set data structure. In some optional embodiments, in addition to an address tag (which may be stored in an address register) used for indicating a storage address range of a corresponding enclave, each entry may include a category tag used for indicating category information of the enclave (which is used to indicate that the enclave is an application enclave, a non-application enclave, a crypto enclave, or a runtime enclave), and/or a permission tag used for indicating the above permission information. In some embodiments, each entry may also be used to indicate auxiliary information such as an enclave number.

Each entry may be stored in a protected area specified in the storage unit, and may be copied by the operating system to a register (for example, implemented by a register file of the processor core 10, or implemented by other registers located within the processing unit) within the processor 100.

Based on the PMP mechanism, the operating system may protect each enclave at a physical level. For example, if an access request (for example, initiated by a DMA controller) has no permission to access an enclave, the operating system marks the access request as referring to an unavailable storage address, so that the access request cannot be executed. For another example, when the processing unit 1100 in user mode tries to fetch an instruction or execute a load/store operation based on an access address, the operating system may compare the access address with the storage address range indicated by each entry in the item list, and determine whether the access address is allowed based on a comparison result. If yes, the processing unit 1100 may continue to perform a corresponding operation based on the access address; if no, an access exception is thrown.

In some embodiments, the enclaves may be separately enabled or disabled. When each of the enclaves is enabled, for detailed description, reference may be made to other embodiments of the present invention, and details are not described herein again. When an enclave is disabled, a program running within the enclave cannot be executed by the processor, or invoked, read and written by other programs.

In a further embodiment, each enclave may also be partially disabled, to prevent partial information within the enclave from being accessed, invoked, or executed. For example, when an application enclave for running a face recognition program is partially disabled, the face recognition program is still able to generate a face recognition result based on face image data received, but the face recognition result cannot be used for performing a subsequent operation (for example, a program running within the runtime enclave and/or the crypto enclave cannot obtain the face recognition result).

As an example, based on the above embodiment, entries corresponding to the enclaves may include an enable tag. The enable tag may be configured by the secure monitor to set whether the enclave is enabled, entirely disabled, or partially disabled. The enable tag indicates whether the enclave is in an enabled state, a disabled state, or a partially disabled state.

In some embodiments, an application program running within an (or some) application enclave(s) may share its permission information with a specified program, so that the specified program can have a temporary access permission for the application enclave.

For example, when a risk detection program running within an application enclave detects that a risk coefficient of the current running environment is high, the risk detection program may disable or partially disable enclaves involving sensitive information (for example, for running a payment application program) to reduce possibility of sensitive information leakage. When the risk detection program detects that the risk coefficient of the current running environment is in an allowable range, it may re-enable each enclave so that the processing unit runs normally. When the risk detection program detects that the risk coefficient of the current running environment is less than a set value, the running environment of the processing unit may be considered very safe, and some applications App_h with a relatively low confidentiality and sensitivity may share its permission information with a specified application program App_s (running within an application enclave AE_s), so that the specified application program App_s can temporarily access the application enclave AE_h in which the application program App_h is located. In this way, the application enclave AE_h is allowed to access the application enclave AE_h other than itself in a specific time period. This example is only used for illustrating a possible implementation of the above embodiment, but not for limiting the embodiments of the present invention.

Secure Boot Method

After the processing unit 1100 boots (for example, in a scenario such as startup, power-on, or restart), a secure boot (Secure Boot) program generally is a first piece of program that needs to be executed by the processor 100. To ensure that the processing unit 1100 can correctly and securely execute various programs and instructions after booting, the secure boot program may be used to control a boot sequence of software and hardware components in the processing unit 1100, and may check the software and hardware components, so that an illegal or malicious program that does not pass the check is denied or unable to boot, ensuring security of the electronic device.

Figure 8:
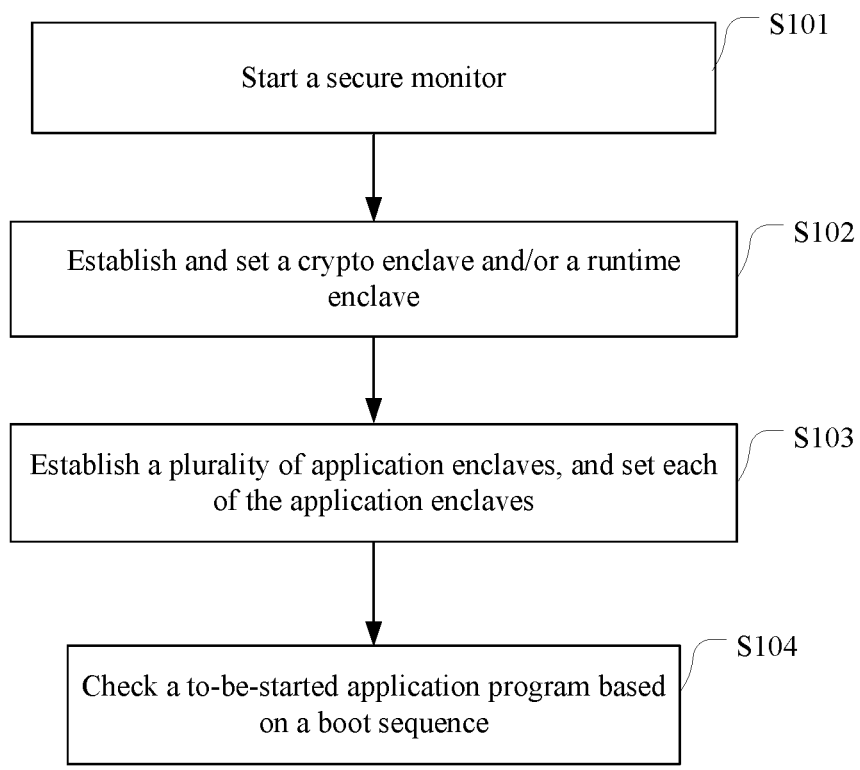
FIG. 8 is a flowchart of a secure boot method according to an embodiment of the present invention.

FIG. 8 is a flowchart of a secure boot method according to an embodiment of the present invention. The secure boot method is, for example, implemented based on any one of the processing units and/or the electronic device disclosed in the embodiments of the present invention.

Step S101: A secure boot program may preferentially enable a secure monitor. Boot sequence information followed by the secure boot program may be stored as a list in a protected area of a storage unit. The boot sequence information may be copied by the secure boot program or a secure monitor into a boot sequence register within a processor 100 to facilitate invocation.

Step S102: After starting to run, the secure monitor may establish a crypto enclave within a storage address range based on a PMP mechanism, write security information into the crypto enclave, and configure a storage address range, permission information, and/or category information corresponding to the crypto enclave, thereby completing setting of the crypto enclave. A runtime enclave may also be configured in step S102.

In some embodiments, the secure monitor may, for example, write security information such as a driver and a library function stored in a non-volatile storage apparatus (such as an external memory) into a corresponding crypto enclave CE and a runtime enclave RE. In some embodiments, the crypto enclave CE may be established with the runtime enclave RE synchronously. In some other embodiments, the crypto enclave CE may be established before the runtime enclave RE, or established after the runtime enclave RE.

In some embodiments, after step S102 completes, a key management system may be driven by a key management system driver stored within a non-application enclave, so that a crypto management service can be started.

Step S103: After starting to run, the secure monitor may establish a plurality of application enclaves AE within a storage address range based on the PMP mechanism, write a specified application program into a corresponding application enclave AE, and configure a storage address range, permission information, and/or category information corresponding to the application enclave, thereby completing setting of the application enclave AE.

In some embodiments, the secure monitor may, for example, write all/a part of executable code and data corresponding to an application program stored in a non-volatile storage apparatus (such as an external memory) into a corresponding application enclave AE, to load various application programs into corresponding enclaves in the storage unit. In some embodiments, step S103 may be performed simultaneously with step S102, or may be performed after step S102, or may be performed before the step S102. This is not limited in this application.

In some embodiments, application programs loaded within a plurality of application enclaves AE may need to be started by default during a secure boot. These application programs that need to be started upon power-on and other software and hardware components may form a boot chain (Boot Chain). A boot process of each boot item in the boot chain may be controlled by the secure boot program provided in the embodiment of the present invention.

Step S104: The secure boot program locates, based on a boot sequence indicated by boot sequence information, an application program that needs to be started currently, and checks each application program before running it, to ensure that the application program can be run securely.

In some embodiments, all boot items in the boot chain need to be measured (measure) and/or signed (signed) by the secure boot program. For example, the secure boot program may perform calculation on a to-be-checked boot item based on a hash (HASH) algorithm to acquire a check value, and compare the check value with an expected hash value. If the two are inconsistent, the boot item or the whole electronic device fails to boot; and if the two are consistent, it may represent that the boot item can be run securely.

Since the secure boot program needs to be highly secured, in some embodiments, the secure boot program may be stored in a read only storage apparatus integrated within the processing unit, or a read only memory in the memory 200, to prevent the secure boot program from being modified, and ensure that the electronic device and the processing unit can be started securely.

In some traditional solutions (for example, the Software Guard Extensions technology, SGX technology for short, is a secure program execution framework launched by Intel), because an independently packaged security chip has a good hardware protection performance and security function, at least part of an Internet of Things device generally is bound with an independently packaged security chip (the security chip is, for example, embedded into a computer device/server) to implement a security protection solution. The security chip usually communicates with an application program over a serial bus on a printed circuit board (Printed Circuit Board, PCB). Although this can isolate the application program from code and data in the security chip, the design difficulty and complexity at the printed circuit board level is relatively high, and the cost is also high. By contrast, in the embodiments of the present invention, a plurality of enclaves (such as a plurality of application enclaves AE, a crypto enclave CE, and/or a runtime enclave RE shown in FIG. 3) are set within the processing unit, for implementing a trusted execution environment required for a security protection function, so that application programs can communicate with the trusted execution environment within the processing unit, reducing the design difficulty, complexity, and cost, and improving security.

In some traditional solutions (such as Arm's TrustZone technology), an electronic device is divided into two portions: a secure world (secure world) and a normal world (normal world), where all trusted application programs are run in the secure world. Each application program running in a whole secure world is likely to be attacked. Therefore, a larger number of application programs running in the secure world indicates a higher risk of being attacked, and different application programs running in the secure world also interfere with each other. By contrast, in the embodiments of the present invention, the application programs that need to be protected/trusted are run within different enclaves isolated from each other, and a non-application enclave oriented to security information is added. This can ensure independent security protection for each application program, and provide enhanced protection for security information such as keys, thereby enhancing the security. For example, in the processing unit according to the embodiments of the present invention, an application program App1 and an application program App2 may be run respectively in an application enclave AE1 and an application enclave AE2 isolated from each other. Therefore, the application program App1 and the application program App2 do not interfere with each other. In addition, a risk of the application enclave AE1 being attacked mainly comes from the application program App1, and a risk of the application enclave AE2 being attacked mainly comes from the application program App2. Compared with the TrustZone technology using a whole secure world, a risk coefficient of the enclaves being attacked is effectively reduced.

In some traditional solutions (such as the Keystone technology proposed by Berkeley), three modes (user mode, machine mode, and hypervisor mode) are set to securely protect sensitive information based on an independently packaged security chip. However, these traditional solutions are oriented to high-performance electronic devices such as servers, with complex design and high cost, so they are not suitable for lightweight electronic devices. By contrast, the embodiments of the present invention is more suitable for lightweight electronic devices. Application enclaves and non-application enclaves can be set within a chip or a system on chip in which a processing unit is located by setting a minimum of only two modes (user mode, and machine mode), thereby simplifying design and reducing costs. Moreover, in some preferable solutions, the embodiments of the present invention can use non-application enclaves to implement more optimizations (for example, setting a shared library to save storage space and/or further improve security of a key management system), thereby further reducing costs and/or improving security performance. For example, within the runtime enclave RE according to the embodiments of the present invention, shared information such as a shared program may be included, and different application programs may invoke the shared information within the runtime enclave RE, so that the same shared information does not need to be repeatedly stored in the processing unit, saving storage space and reducing costs. For another example, in some embodiments with high security, a crypto enclave CE is used to provide a storage space required for running a crypto related program, and information stored within the crypto enclave CE cannot be read, written, or even executed by any other enclaves (such as an application enclave and a runtime enclave), thereby ensuring that the crypto related program can be run in a highly secure, trusted execution environment, and not be stolen by a program with a low security level. Compared with the prior art, security is further improved.

In conclusion, compared with traditional solutions, the processing unit and the electronic device according to the embodiments of the present invention can establish a TEE within the processing unit based on a plurality of application enclaves, a crypto enclave, and/or a runtime enclave, so as to allocate independent application enclaves for various application programs. In this way, the processing unit can run corresponding application programs independently within the application enclaves, so that it can be ensured that each of the application programs is independently protected for security, enhancing security, and preventing sensitive information involved in the application programs from being stolen.

In some embodiments, a crypto enclave different from the application enclaves is included in the memory, and the processing unit may run a crypto related program within the crypto enclave to further prevent crypto information from being illegally acquired, improving security of the processing unit.

In some embodiments, a runtime enclave different from the application enclaves is included in the memory, and the processor can run shared resources within the runtime enclave, such as a shared program, so that repeated occupation of storage resources can be reduced, saving storage space.

In some optional embodiments, the present invention can set the plurality of enclaves having various categories by only setting two modes (user mode and machine mode), thereby simplifying design, saving costs, and better adapting to a lightweight processing unit and a lightweight electronic device without requiring a complex software and hardware architecture.

In some embodiments, the processing unit of the present invention sets a plurality of enclaves and corresponding processor cores within a system on chip for implementing a trusted execution environment required for a security protection function, so that application programs can communicate with the trusted execution environment within a chip, reducing the design difficulty, complexity, and costs, and improving security.

This application further discloses a security control method for implementing the foregoing embodiments. For specific steps, reference may be made to the description in the foregoing embodiments, and details are not described herein again.

This application further discloses a computer-readable storage medium including computer executable instructions stored thereon, where when being executed by a processor, the computer executable instructions cause the processor to perform the method according to the embodiments described herein.

Also, this application further discloses an electronic device, where the electronic device includes an apparatus for implementing the method according to the embodiments described herein.

It should be appreciated that the above are merely preferred embodiments of the present invention and are not intended to limit the present invention. For those skilled in the art, there are many variations to the embodiments in this specification. Any modification, equivalent replacement, or improvement made without departing from the spirit and principle of the present invention shall fall within the protection scope of the present invention.

It should be understood that, the embodiments in this specification are all described in a progressive manner. For same or similar parts in the embodiments, mutual reference may be made. Each embodiment focuses on what is different from other embodiments. Especially, a method embodiment is basically similar to an apparatus embodiment and a system embodiment, and therefore is described briefly; for related parts, reference may be made to partial descriptions in other embodiments.

It should be understood that specific embodiments of this specification are described above. Other embodiments fall within the scope of the appended claims. In some situations, the actions or steps recorded in the claims can be performed in a sequence different from that in the embodiments and a desired result can still be achieved. In addition, the process depicted in the accompanying drawings does not necessarily need a specific sequence or a consecutive sequence to achieve the desired result. In some implementations, multi-task processing and parallel processing can be feasible or can be advantageous.

It should be understood that an element described herein in a singular form or only one of which shown in the drawings does not mean that the number of the elements is limited to one. Also, separated modules or elements described or shown herein may be combined as a single module or element, and a single module or element described or shown herein may be divided into a plurality of modules or elements.

It should also be understood that, the terms and expressions employed herein have been used only for the purpose of description, and one or more embodiments of this specification are not limited to these terms and expressions. The use of these terms and expressions is not intended to exclude any equivalent features of the description (or a portion thereof), and it should be recognized that various modifications that may exist should also be included within the scope of the claims. Other modifications, changes, and replacements may also exist. Accordingly, the claims are to be construed as covering all such equivalents.

The invention claimed is:

1. A processing unit, comprising:
a processor adapted to run a program;
a memory, coupled to the processor and adapted to provide a plurality of enclaves isolated from each other, wherein the plurality of enclaves comprises a plurality of application enclaves, each of the plurality of application enclaves is used for running a respective application program, and the plurality of enclaves further comprises at least one of the following:
a runtime enclave adapted to provide a storage space required for running an invokable program; and
a crypto enclave adapted to provide a storage space required for running a crypto related program; and
a permission register used for storing permission information of each of the plurality of enclaves,
wherein the processor is adapted to control an access operation of each of the plurality of enclaves based on access permission indicated by the permission information, wherein the permission information of the application enclave is configured with execute permission for one or more of the runtime enclave and the crypto enclave and further with no read/write permission for the one or more of the runtime enclave and the crypto enclave, and
wherein the runtime enclave and the crypto enclave have at least read/write permission for the plurality of application enclaves, and each of the plurality of application enclaves has no read/write permission for the runtime enclave and the crypto enclave.

2. The processing unit according to claim 1, wherein the invokable program is a shared program and/or a generic driver oriented to different application programs.

3. The processing unit according to claim 1, wherein the processor comprises a first processor core adapted to run the crypto related program oriented to a cryptographic service within the crypto enclave.

4. The processing unit according to claim 3, further comprising a key management component adapted to provide the cryptographic service to generate an encryption/decryption result, wherein
the first processor core is coupled to the key management component and writes the encryption/decryption result into a corresponding application enclave by running the crypto related program within the crypto enclave.

5. The processing unit according to claim 1, further comprising:
an address register used for storing address information corresponding to each of the plurality of application enclaves,
wherein the access permission comprises at least read/write permission and execute permission.

6. The processing unit according to claim 5, wherein the permission information of the application enclave is configured with no access permission for the plurality of application enclaves other than itself.

7. The processing unit according to claim 5, wherein the permission information of the crypto enclave and the runtime enclave is configured with read/write permission and execute permission for the plurality of application enclaves.

8. The processing unit according to claim 5, wherein a first application enclave of the plurality of application enclaves shares permission information with a specified second application enclave, such that the second application enclave has temporary access permission for the first application enclave.

9. The processing unit according to claim 5, wherein the processor is adapted to:
run an operating system;
run one or more of the application program, the invokable program, and the crypto related program in user mode; and
run a secure monitor in machine mode to configure the address register and the permission register, and switch a control right of the processor between different programs within the plurality of enclaves.

10. The processing unit according to claim 1, wherein at least one of the plurality of enclaves is configured by a corresponding enable tag, and wherein the enable tag indicates that a corresponding enclave is in an enabled state, a disabled state, or a partially disabled state.

11. The processing unit according to claim 1, wherein the memory comprises one or more of a read-only memory module, a dynamic and/or static random access memory module, a nonvolatile random access memory module, and a memory mapped-input/output module.

12. The processing unit according to claim 1, further comprising:
a direct storage access controller adapted to access the memory in response to a request of the processor; and/or
a power management module adapted to provide a supply voltage required for the processing unit to work.

13. The processing unit according to claim 1, wherein the processing unit is integrated into a system on chip.

14. A security control method, comprising:
configuring a plurality of enclaves isolated from each other in a memory, wherein the plurality of enclaves comprises a plurality of application enclaves, a runtime enclave, and/or a crypto enclave;

running a corresponding application program within each of the plurality of application enclaves;

running an invokable program within the runtime enclave, and/or running a crypto related program within the crypto enclave;

storing permission information of each of the plurality of enclaves; and controlling an access operation of each of the plurality of enclaves based on access permission indicated by the permission information, wherein the permission information of the application enclave is configured with execute permission for one or more of the runtime enclave and the crypto enclave and further with no read/write permission for the one or more of the runtime enclave and the crypto enclave, wherein the runtime enclave and the crypto enclave have at least read/write permission for the plurality of application enclaves, and each of the plurality of application enclaves has no read/write permission for the runtime enclave and the crypto enclave.

15. The security control method according to claim 14, wherein the invokable program is a shared program and/or a generic driver oriented to different application programs.

16. The security control method according to claim 14, further comprising:

writing an encryption/decryption result into a corresponding application enclave, wherein the encryption/decryption result is acquired by the crypto related program running within the crypto enclave.

17. The security control method according to claim 14, wherein in user mode, the crypto related program is run by a first processor core, and each of the application programs is run by a second processor core.

18. The security control method according to claim 14, wherein the step of configuring the plurality of enclaves isolated from each other in the memory comprises:

running a secure monitor in machine mode, wherein the secure monitor is adapted to configure address information and the permission information corresponding to each of the plurality of enclaves, so that the security control method controls the access operation of each of the plurality of enclaves in user mode; and the access permission comprises at least read/write permission and execute permission.

19. The security control method according to claim 18, wherein the permission information of the plurality of enclaves indicates at least one of the following configurations:

the application enclave has no access permission for the plurality of application enclaves other than itself;

the application enclave has execute permission for the crypto enclave and the runtime enclave;

the crypto enclave and the runtime enclave have read/write permission and execute permission for the plurality of application enclaves;

the runtime enclave has no read/write permission for the crypto enclave;

the crypto enclave has no read/write permission for the runtime enclave;

the runtime enclave has no execute permission for the crypto enclave; and each of the plurality of enclaves has no access permission for the secure monitor.

20. A non-transitory computer-readable storage medium storing instructions thereon, wherein when the instructions are executed, the steps of the security control method according to claim 14 are implemented.

* * * * *